Figure 1:
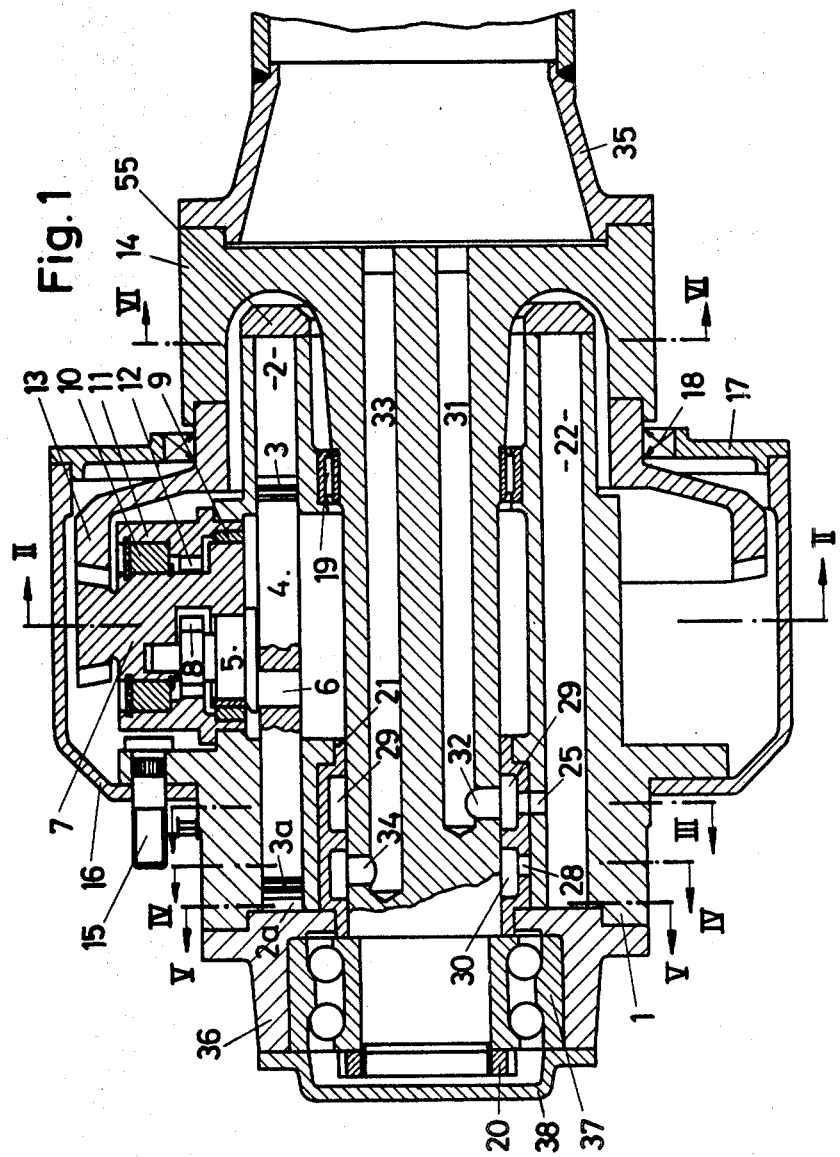

United States Patent

[11] 3,603,420

| [72] | Inventor | Heinrich Peter Brandt<br>Wiehl, Germany |
|---|---|---|
| [21] | Appl No. | 834,983 |
| [22] | Filed | June 20, 1969 |
| [45] | Patented | Sept. 7, 1971 |
| [73] | Assignee | Fritz Kotz and Christian Peter Kotz |

[54] HYDROSTATIC WHEEL-HUB DRIVE MECHANISM PRIMARILY FOR VEHICLES NOT TIED TO RAILS
5 Claims, 11 Drawing Figs.

[52] U.S. Cl. .................................................. 180/66 F,
 91/499, 91/501, 91/502, 92/57
[51] Int. Cl. .................................................. B60k 7/00
[50] Field of Search .................................... 180/66, 55;
 91/197, 198, 199, 175, 176, 502, 472, 501, 507,
 499; 92/57

[56] References Cited
UNITED STATES PATENTS

| 2,353,730 | 7/1944 | Joy | 180/66 (F) |
| 2,357,742 | 9/1944 | Jeffrey | 180/66 (F) X |
| 2,614,540 | 10/1952 | Morton | 91/502 |
| 3,439,766 | 4/1969 | Dence et al. | 180/66 (F) |

Primary Examiner—Benjamin Hersh
Assistant Examiner—Milton L. Smith
Attorney—Bair, Freeman & Molinare ABSTRACT: A hydrostatic wheel-hub drive mechanism, primarily for vehicles not tied to rails, characterized by the provision within the wheel hub of hydrostatically driven pairs of pistons, each pair having a common piston rod arranged parallel with the axis of the wheel hub and gearing operable to convert the reciprocating motion of the pairs of pistons to rotary motion of the wheel.

INVENTOR.
HEINRICH PETER BRANDT

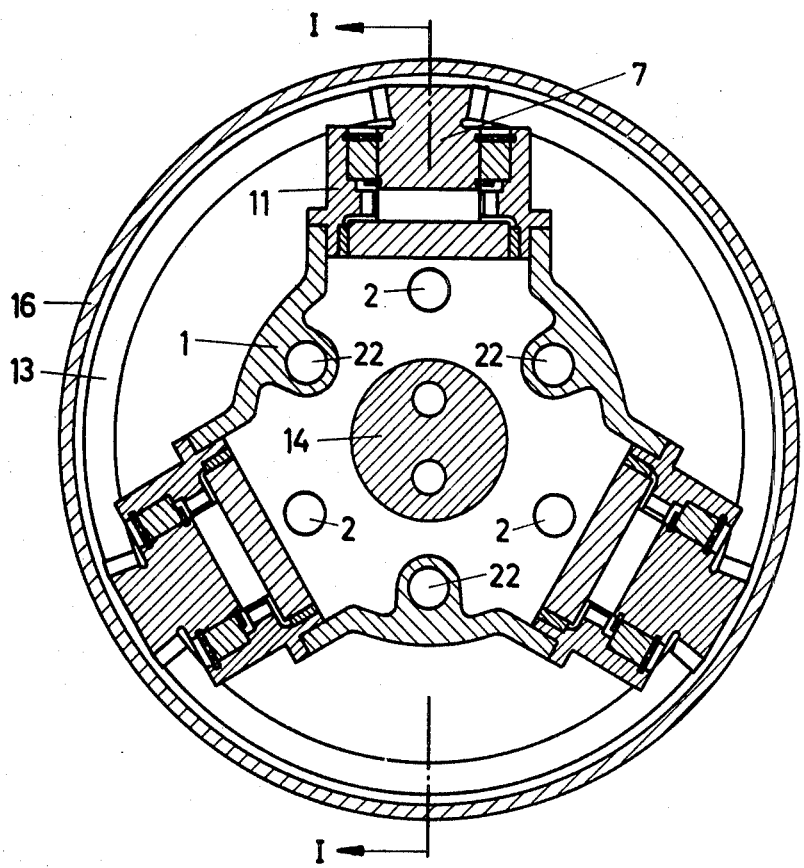

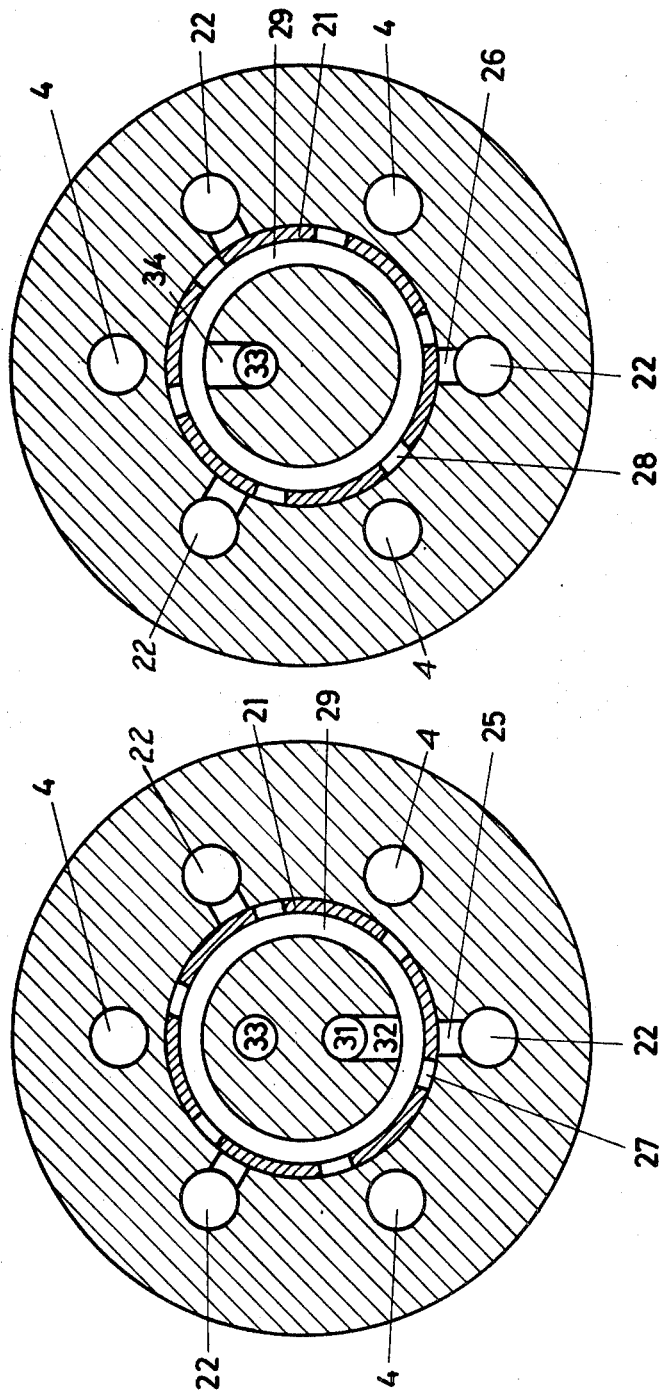

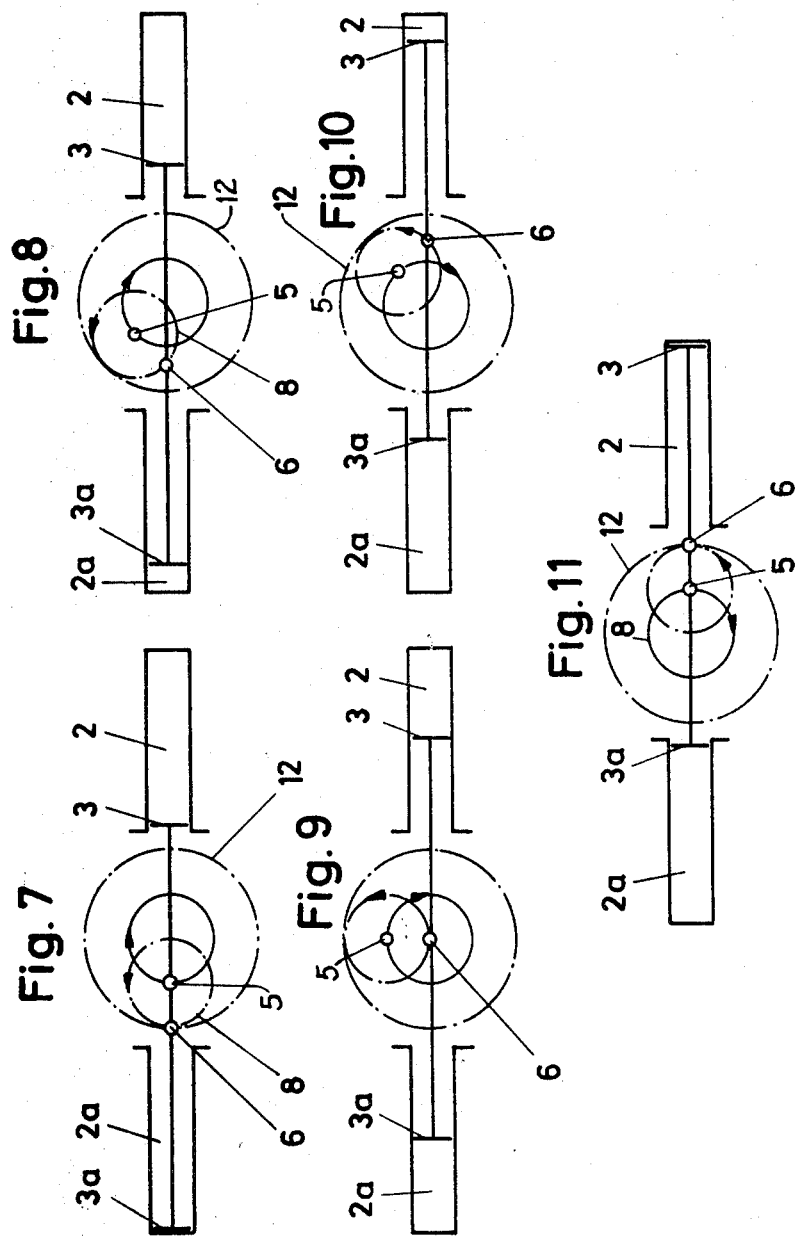

3,603,420

HYDROSTATIC WHEEL-HUB DRIVE MECHANISM PRIMARILY FOR VEHICLES NOT TIED TO RAILS

BACKGROUND OF THE INVENTION

The present invention relates to a hydrostatic wheel-hub drive mechanism, primarily for vehicles not tied to rails, such as lorries, but also including heavy earth-shifting machines.

In existing drive arrangements, the torque supplied by the driving unit, an Otto or Diesel engine, is first transmitted by way of a gearbox to one or more differential gears on the wheels. This chain of mechanisms for transmitting and converting the torque is not only complicated as regards the general design, but also heavy and bulky.

These drawbacks become still more troublesome when it is a question of vehicles that have several pairs of driven wheels, especially heavy earth-shifting machines, where heavy drives have to be transmitted over a wide range of speeds.

BRIEF SUMMARY OF THE INVENTION

The purpose of the present invention is to provide a hydrostatic drive mechanism in which practically all the conventional mechanical means of power transmission, such as gearboxes, differential gears, cardan shafts and the like, are dispensed with and the driving torque is applied directly to the wheel or wheels.

This is achieved by providing within the wheel hub hydrostatically driven pairs of pistons having a common piston rod and lying concentrically about the wheel-hub axis, gearing being used to convert the reciprocating motion of the pairs of pistons to rotary motion in the wheels.

The pairs of pistons, at least three of which are arranged concentrically in relation to the wheel hub, may well be operated by oil supplied under pressure by an oil pressure pump driven by, for example, an internal combustion engine.

Each of the piston groups referred to above comprises two pistons joined together by a common piston rod. The piston rods contain a hole to take a pin on a shaft on which is mounted a gearwheel having a pitch circle half as large as the pitch circle of an internal toothed ring attached to a housing, in which is also mounted a bevel wheel in which the shaft is also mounted eccentrically with a pin fixed to it. The bevel wheel meshes with a crown wheel, which transmits the torque to the wheel hub.

The pressure oil feed and return for the wheel-hub drive mechanism are effected through holes in the stub axle leading to annular grooves in a control sleeve, by which the oil feed and return to or from the cylinders are opened according to the position of the wheel hub.

Figure 5:
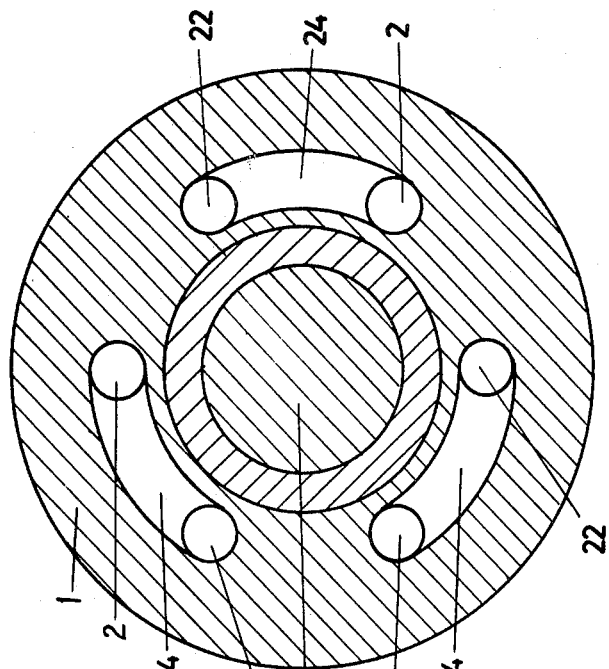
Figure 6:
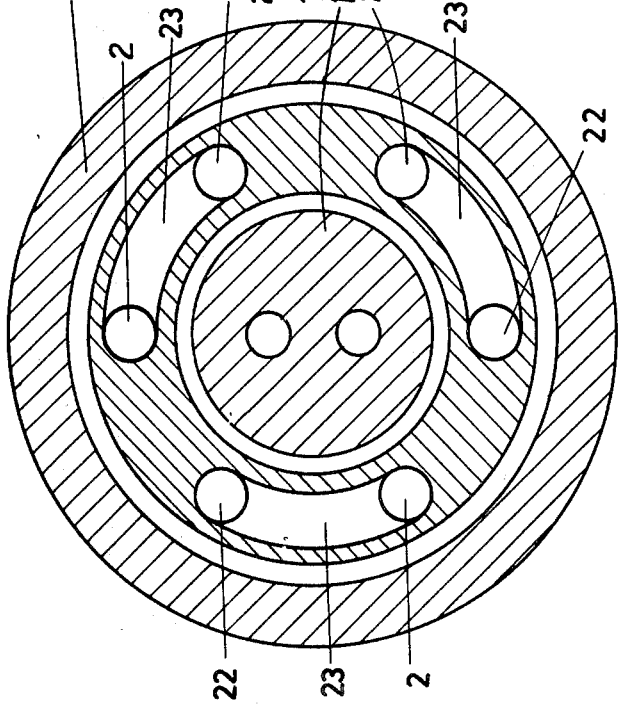

One embodiment of the invention will now be described by way of example, reference being made to the accompanying drawings in which:

FIG. 1 is a section through the hydrostatic wheel-hub drive mechanism;

FIG. 2 is a section along the line II—II in FIG. 1;
FIG. 3 is a section along the line III—III in FIG. 1;
FIG. 4 is a section along the line IV–IV in FIG. 1;
FIG. 5 is a section along the line V—V in FIG. 1;
FIG. 6 is a section along the line VI—VI in FIG. 1; and
FIGS. 7 to 11 provide a diagrammatic representation of the various stages of motion, in which the gearing by which the reciprocating motion of the pistons is converted into rotary motion is shown for one stroke of a pair of pistons.

As can be seen from FIG. 1, the cylinders 2 and 2a, with their pistons 3 and 3a, are located within the wheel hub 1, each two pistons being joined together by one piston rod 4. Mounted in each piston rod 4 is a pin 6 eccentrically connected to a shaft 5. The shaft 5 in turn is mounted eccentrically in a bevel wheel 7 and carries a gearwheel 8. The bevel wheel 7 is mounted in bearings 9 and 10 in a housing 11. Connected to the housing 11 is the internally toothed ring 12, which is in mesh with the gearwheel 8 on the shaft 5. The bevel wheel 7 meshes with a crown wheel 13, which is connected to as stub axle 14, while the housing 11 is fixed to the wheel hub 1. Fitted in the wheel hub 1 are wheel bolts 15, by which the wheels (omitted from the drawing for the sake of greater clarity) are secured to the wheel hub. A housing 16, a cover 17 and a packing 18 seal the drive mechanism from the outside. The cover 55 is attached to the wheel hub 1 and seals off the cylinders from the outside. A bearing bracket 36 is also attached to the wheel hub 1 and serves to seal off the other cylinders 2a from the outside while accommodating the bearing 37. A cap 38 seals the drive mechanism from the outside. The wheel hub 1 is mounted on the stub axle 14 with the aid of the bearings 19 and 37. Groove nuts 20 are used for screwing the bearing 37 to the stub axle 14. For regulating the supply of pressure oil for driving the pistons 3 and 3a, a control sleeve 21, attached to the stub axle 14, is provided. The wheel hub 1 also contains connecting ways or passages 22, which run axially and which are arranged about the stub axle, alternating with the cylinder bores. These ways serve to pass pressure oil to the cylinders 2 through slots 23 (FIGS 5 and 6), while slots 24 (FIGS 1 and 4) supply the oil to the piston 3a. Passages 26 and 25 connect the ways 22 to passages 27 and 28 in the control sleeve 21, through which the oil under pressure is fed and returned, by way of annular grooves 29 and 30, through bores 31–32 and 33–34 in the stub axle 14. The wheel-hub drive mechanism is fixed by some suitable means to the axle tube 35.

The mode of operation of the drive mechanism here proposed is as follows. Oil under pressure is fed to the drive mechanism, for example, through the bore 31 and through the further transverse bore 32 in the stub axle 14 to the annular groove 29 in the control sleeve 21. According to the position of the wheel hub 1 in relation to the cylinders 2 and 2a, the oil feed to the cylinder 2 takes place through the passages 25 and the connecting way 22 to the slots 23 or through the passage 27, the connecting ways 22 and the slots 24 to the cylinders 2a and hence to the pistons 3 and 3a, so that the pin 6 in the piston rod 4 is moved axially towards the piston. The pistons in the drive mechanism are thus only single acting. This axial displacement is made possible by virtue of the fact that the center of the pin 6 at its outermost position lies on the pitch circle of the internal toothed ring 12, but the pitch circle of the gearwheel 8 on the shaft 5 is half that of the toothed ring 12. The shaft in turn is so mounted in the bevel wheel 7 that the gearwheel 8 is in mesh with the toothed ring 12.

FIGS. 7 to 11 illustrate a half-revolution of the bevel wheel 7 and hence one stroke of the pistons 3 and 3a. In FIG. 7, the piston 3a is at top dead center, while the piston 3 is at bottom dead center. This position will be called the starting position. Next, FIG. 8 shows how the bevel wheel has turned through 45°, the shaft 5 and gearwheel 8 following the motion, so that the pin 6 moves inwards in a straight line on the piston rod. This necessarily results in a downward movement of the piston 3a and an upward movement of the piston 3. FIG. 9 shows a position in which the bevel wheel 7 as turned through 90°. The shaft 5 with the gearwheel has taken part in the movement, so that the pin 6 has migrated to the center of the bevel wheel 7. When the bevel wheel 7 has turned through 135°, as shown in FIG. 10, the shaft 5 with gearwheel 8 having followed the motion, the pin 6 will have moved out to the right from the position of the center of the bevel wheel 7; and for a further 180° turn of the bevel wheel 7, illustrated in FIG. 11, as the shaft 5 and gearwheel 8 have also turned, the pin 6 reaches the top dead center position. The piston 3a is now at bottom dead center and the piston 3 at top dead center.

When the bevel wheel 7 continues to rotate, the starting position shown in FIG. 7 will be reached once more after one revolution of the bevel wheel 7.

Let it be assumed, for example, that the transmission ratio between the bevel wheel 7 and crown wheel 13 is such that the bevel wheel 7 carries out six revolutions to one revolution of the wheel hub. The pistons will then work as follows:

Piston 3a    starting working stroke

After half a revolution of the bevel wheel 7 (=one-twelfth of a revolution of the wheel hub), the discharge stroke begins with piston 3a and the working stroke with piston 3. After a full revolution of the bevel wheel 7 (=one-sixth of a revolution of the wheel hub), the working stroke begins with piston 3a and the discharge stroke with piston 3. After one revolution of the bevel wheel, the starting position for the bevel wheel 7 is reached, the drive mechanism having carried out one-sixth of a revolution. Each of the pistons 3 and 3a thus has six working strokes to one revolution of the wheel hub. The number of pistons in the wheel-hub drive should always be made such that no outward imbalance arises from unbalanced masses. The feed and return passages must be arranged in the control sleeve according to the working-stroke sequence.

I claim:

1. A hydrostatic wheel-hub drive mechanism comprising in operative relationship:
   a. a stub axle,
   b. a crown wheel mounted on said stub axle,
   c. a hub adapted to be rotated around said axle,
   d. means for driving said hub journaled on said axle, said drive means including:
      1. a housing having an internal toothed ring disposed annularly about said stub axle,
      2. a bevel wheel disposed to engage said crown wheel and having its axis of rotation oriented substantially perpendicular to said stub axle,
      3. means for rotation of said bevel wheel operatively connected thereto and disposed between said bevel wheel and said stub axle, said rotation means including:
         i. a pair of hydrostatically driven reciprocating pistons having a common piston rod connecting said pistons disposed in cylinders in said housing and oriented parallel to the axis of the wheel hub,
         ii. a shaft journaled offcenter in said bevel wheel having means connecting said shaft to said piston which permit rotation of said shaft upon reciprocation of said pistons, and
         iii. a gear wheel mounted on said shaft, and disposed to engage said internal toothed ring, whereby said hub is rotationally driven upon reciprocation of said pistons.

2. A mechanism as in claim 1 which includes at least three pairs of pistons arranged about the axis of the wheel hub and driven by oil supplied under pressure by an oil pressure pump.

3. A mechanism as in claim 2 which includes:
   a. a control sleeve journaled on said stub axle, and having annular passages therein which communicate with spaced radial apertures in said control sleeve,
   b. oil feed bores disposed in said stub axle communicating with said annular passages in said control sleeve,
   c. passages disposed in said housing communicating from said radial apertures to said cylinders.

4. A mechanism as in claim 3 wherein said passages include annularly disposed arcuate slots, one end of which communicates with said cylinders.

5. A mechanism as in claim 1 wherein:
   said shaft-piston connecting means includes a pin mounted on said shaft engaging a hole in said piston rod, and
   said gearwheel has a pitch circle half as large as the pitch circle of said internal toothed ring.